United States Patent [19]

Sakoe

[11] Patent Number: 4,581,755
[45] Date of Patent: Apr. 8, 1986

[54] VOICE RECOGNITION SYSTEM

[75] Inventor: Hiroaki Sakoe, Tokyo, Japan

[73] Assignee: Nippon Electric Co., Ltd., Tokyo, Japan

[21] Appl. No.: 436,978

[22] Filed: Oct. 27, 1982

[30] Foreign Application Priority Data

Oct. 30, 1981 [JP] Japan ............................... 56-174109

[51] Int. Cl.⁴ ............................................... G10L 1/00
[52] U.S. Cl. ...................................................... 381/42
[58] Field of Search .................................... 381/41–44;
364/513.5

[56] References Cited

U.S. PATENT DOCUMENTS

| | | | |
|---|---|---|---|
| 3,816,722 | 6/1974 | Sakoe et al. | 235/152 |
| 3,969,698 | 7/1976 | Bollinger et al. | 381/43 |
| 4,053,710 | 11/1977 | Advani et al. | 381/42 |
| 4,100,370 | 7/1978 | Suzuki et al. | 381/42 |

*Primary Examiner*—E. S. Matt Kemeny
*Attorney, Agent, or Firm*—Blakely, Sokoloff, Taylor & Zafman

[57] ABSTRACT

There is provided a voice recognition system comprising a standard pattern memory in which a voice pattern of a predetermined word is stored as a positive reference pattern and also voice patterns of words similar to but different from the first-mentioned word are stored as negative reference patterns, a pattern comparator for calculating dissimilarities of an input voice pattern with respect to the positive reference pattern and negative reference patterns, and a discriminator for providing a coincidence confirmation output signal when the dissimilarity with respect to the positive reference pattern is less than a predetermined threshold value and less than the dissimilarities with respect to the negative reference patterns while otherwise rejecting the result of recognition.

4 Claims, 1 Drawing Figure

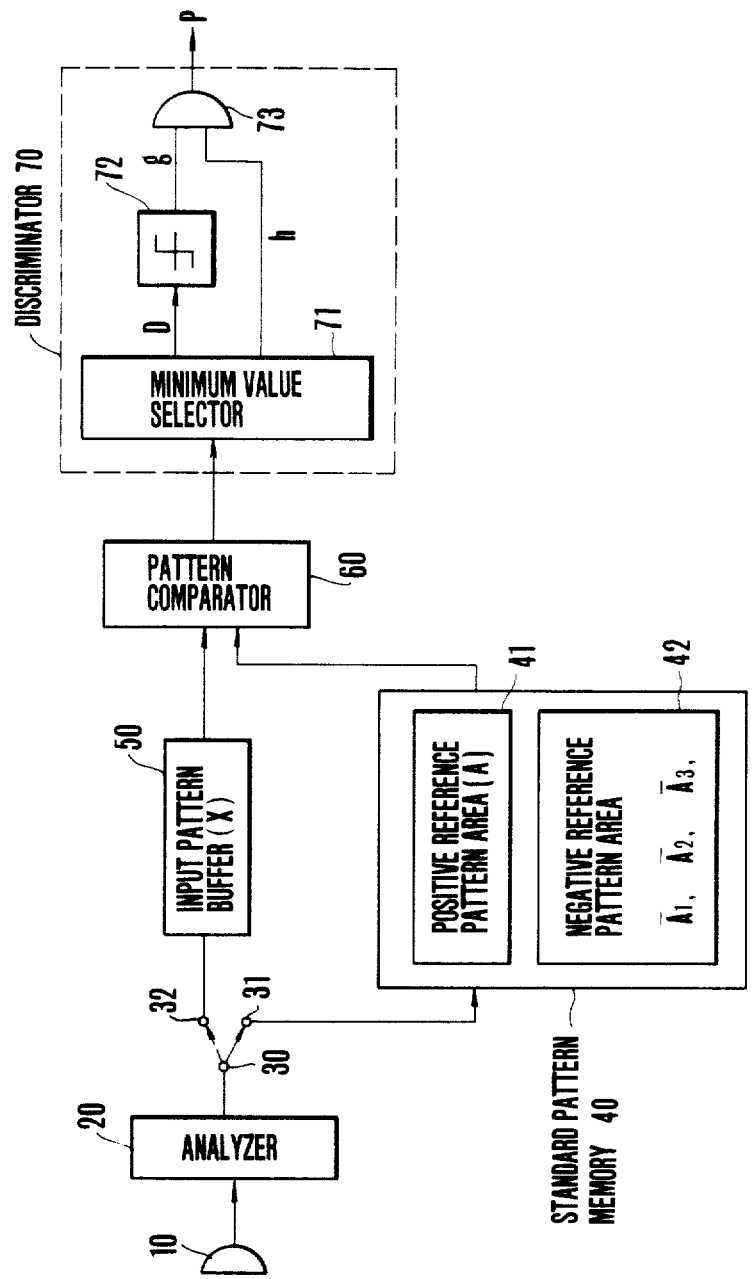

VOICE RECOGNITION SYSTEM

BACKGROUND OF THE INVENTION

This invention relates to a voice recognition system and, more particularly, to a voice recognition system having a function of confirming the identity of the speaker.

Speaker confirmation systems in which a human voice spoken is analyzed to determine whether it is of a registered person may be applied to person certifying means in banks or check-in and check-out control systems, and their practical realization has been expected. Speaker confirmation systems are sometimes called speaker recognition or speaker check systems, and have long been studied.

A conventionally developed speaker confirmation system is based on a pattern matching method.

In this system, a voice pattern of a password of a registered speaker is stored in advance as a standard pattern A and at the time of confirmation, an input password voice pattern X spoken by the speaker is compared with the standard pattern to calculate the dissimilarity D (X, A). If the dissimilarity is less than a predetermined threshold value $\theta$, it is recognized that the input voice pattern coincides with the standard pattern. In this case, the speaker is determined to be the registered person. Conversely, if the dissimilarity is greater than the threshold value $\theta$, it is recognized that the two patterns do not coincide, and the speaker is determined to be an impostor.

The reliability of the prior art voice recognition system having a function of confirming the speaker as described above is greatly influenced by the magnitude of the threshold value $\theta$. Erroneous operation of speaker confirmations systems are of two different kinds, i.e., a false rejection of the true registered speaker as an impostor and a false acceptance of an impostor as the true registered speaker. When the threshold value $\theta$ is reduced, the possibility of false rejection can be reduced, but the possibility of false acceptance is increased. Conversely, if the threshold value $\theta$ is increased, the false rejection can be reduced, but the false acceptance is increased.

In applications to the person confirmation in banks or check-in and check-out control systems, it is thought that the threshold value $\theta$ should be set to be rather low in view of the seriousness of the result that might occur from the false acceptance. This necessarily leads to a system that in case of a false rejection the speaker must pronounce the password repeatedly until it is properly accepted. This method, however, leads to a reduction in service in the case of person confirmation in banks or to a great inconvenience in check-in and check-out control systems.

SUMMARY OF THE INVENTION

An object of this invention is to provide a voice recognition system capable of enhancing correct recognition efficiency.

Another object of this invention is to provide a voice recognition system capable of minimizing false recognition.

According to the invention, there is provided a voice recognition system comprising a standard pattern memory in which a voice pattern of a predetermined voice or sound is stored as a positive reference pattern and also voice or sound patterns similar to but different from the first-mentioned voice pattern are stored as negative reference patterns, a pattern comparator for operating dissimilarities of an input voice pattern with respect to the positive reference pattern and negative reference patterns, and a discriminator for providing a coincidence confirmation output signal when the dissimilarity with respect to the positive reference pattern is less than a predetermined threshold value and less than the dissimilarities with respect to the negative reference patterns while otherwise rejecting the result of recognition (providing no output), whereby the degree of correct recognition can be enhanced and at the same time the degree of false recognition can be reduced, thereby improving the rate of recognition.

BRIEF DESCRIPTION OF THE DRAWING

A single FIGURE is a block diagram showing an embodiment of the invention.

DESCRIPTION OF PREFERRED EMBODIMENT

Now, the invention will be described by way of example with reference to a single figure showing a block diagram of a voice recognition system embodying the invention. A voice signal coupled to a receiver (e.g., a microphone) 10 is fed to an analyzer 20 to be frequency-analyzed therein. The analyzer 20 used may be of any construction which has an analysis function based on a bandpass filter and is capable of sampling data at an analysis frame period of 10 msec. and encoding the sampled data into a digital signal. Such an analyzer may have, for example, a construction as shown at INPUT 101 in FIG. 11 of U.S. Pat. No. 3,816,722. The voice pattern A that is obtained in this way is a time series of vectors written as, $$A = a_1, a_2, \ldots a_j'' \ldots a_J \ldots \qquad (1)$$

The system of the embodiment can operate in two different modes, i.e., a registration mode and a confirmation mode. In the registration mode, a switch 30 is transferred to a contact 31. An input voice is stored as a standard pattern in a standard pattern memory 40. The standard pattern consists of a positive reference pattern and negative reference patterns. A password may be a word such as "fojisan", for example. A person to be registered inputs the positive reference pattern by pronouncing this password. Also, he or she inputs three different negative reference patterns by pronouncing three different words, namely, "fujisan", "fujesan" and "fujison". The positive reference pattern thus inputted is indicated at A, and the negative reference patterns at $\overline{A}HD 1$, $\overline{A}_2$, and $\overline{A}_3$. The positive reference pattern A is stored in a positive reference pattern area 41, and the negative reference patterns are stored in a negative pattern area 42. In the foregoing, the input voice has been referred to as words, but this is not limitative and voice or sound patterns way be used as reference patterns.

In relation to the positive. reference pattern as expressed in equation (1), the negative reference patterns in the form of a time series of vectors are given in equation (2):

$$\left.\begin{array}{l}\overline{A}_1 = \overline{a}_1{}^1, \overline{a}_2{}^1, \ldots \overline{a}_j{}^1 \ldots \overline{a}_J{}^1 \\ \overline{A}_2 = \overline{a}_1{}^2, \overline{a}_2{}^2, \ldots \overline{a}_j{}^2 \ldots \overline{a}_J{}^2 \\ \overline{A}_3 = \overline{a}_1{}^3, \overline{a}_2{}^3, \ldots \overline{a}_j{}^3 \ldots \overline{a}_J{}^3 \end{array}\right\} \quad (2)$$

In the confirmation mode, the switch 30 is transferred to a contact 32. When a person who asserts to be a registered person pronounces the password, the output of the analyzer 20 is fed to an input pattern buffer 50.

In the following description, an input pattern X is denoted by, $$X = x_1, x_2, \ldots x_i, \ldots x_I \ldots \quad (3)$$

In a pattern comparator 60, the input pattern X is compared with the positive reference pattern A and negative reference patterns $\overline{A}_1$, $\overline{A}_2$ and $\overline{A}_3$. The dissimilarities D (X, A), D (X, $\overline{A}_1$), D (X, $\overline{A}_2$) and D (X, $\overline{A}_3$) are calculated and supplied to a discriminator 70.

The pattern comparator 60 adapted to calculate the dissimilarities between the input pattern X in the form of a time series of vectors and the standard patterns (A, $A_1$, $A_2$, $A_3$) also in the form of a time series of vectors may be constituted by such a circuit as shown in FIG. 8 of U.S. Pat. No. 3,816,722 mentioned hereinbefore.

The discriminator 70, which is shown in a dotted block in FIG. 1, includes a minimum value selector 71, a threshold value circuit 72 and an AND gate 73. In the minimum value selector 71, the dissimilarities mentioned above are compared with one another, and the minimum value is provided as signal D. If a standard pattern corresponding to the minimum value is the positive reference pattern A, a first confirmation signal h = 1 is provided. If it is any one of the negative reference patterns $\overline{A}_1$, $\overline{A}_2$ and $\overline{A}_3$, h=0 is provided as the first confirmation signal. In the threshold circuit 72, the minimum value signal D is compared with a threshold value $\theta$. If D <$\theta$, a second cinfirmation signal g =1 is provided. If D $\geq \theta$, g =0 is provided as the second confirmation signal. The AND gate 73 ANDs the first confirmation signal h and second confirmation signal g and provides the result as a coincidence confirmation signal p. It is to be noted that the confirmation signal p is 1 only when the dissimilarity of the input pattern X with respect to the positive reference pattern A is minimum and the minimum value is less than the threshold value $\theta$.

With the negative reference patterns used as shown above, in case if a person other than the registered person pronouces a password "fojisan", the pronouced password may be more or less close to a negative reference pattern due to a difference in the tone quality with respect to the registered person. In such a case, the impostor is exactly rejected. Since the rejecting function is enhanced as in the above, the possibility of false acceptance is not increased so much even by setting the threshold value $\theta$ to be high value. Thus, it is possible to set the threshold value $\theta$ to a high value and reduce the possibility of false rejection. So long as the registered person pronouces the password correctly, it is very rare that the dissimilarity with respect to a negative reference pattern becomes smaller than the dissimilarity with respect to the positive reference pattern, so that there is less tendency for increasing possibility of false rejection. Thus, according to the invention it is possible to greatly reduce the possibility of erroneous operation in speaker confirmation.

While an embodiment of the invention has been described to show the principle and construction underlying the invention, it is by no means limitative. In a practical system, passwords may be pronounced by a number of persons and stored, and a registration code may be inputted to select corresponding standard patterns for comparison of the input pattern with the selected standard patterns. In this case, the principle underlying the invention may directly be applicable by preparing a positive reference pattern and negative reference patterns for each registered speaker.

What is claimed is:

1. A voice recognition system comprising a standard pattern memory in which a voice pattern of a predetermined voice or sound is stored as a positive reference pattern and also at least one voice or sound pattern generated by said predetermined voice or sound similar to the first-mentioned voice pattern is stored as a negative reference pattern, a pattern comparator for calculating the dissimilarities of an input voice pattern with respect to both the positive reference pattern and the negative reference pattern, and a discriminator for providing a coincidence confirmation output signal when the dissimilarity with respect to the positive reference pattern is less than that with respect to the negative reference pattern.

2. A voice recognition system according to claim 1 wherein said discriminator comprises a minimum value selector for comparing the dissimilarities with one another to produce a minimum value signal and a first signal when the minimum value signal is related to the positive reference pattern, a threshold value circuit for comparing the minimum value signal with a threshold value to produce a second signal when the minimum value is less than the threshold value, and means for generating said coincidence confirmation output signal when the first and second signals are both present.

3. A system for sound recognition comprising:
    a first means for storing a first group of information representing a correct sound pattern data;
    a second means for storing a second group of information representing at least one incorrect sound pattern data;
    means for receiving input sound information;
    a first generating means coupled to said first and second means and said receiving means for generating a first signal when said input sound information is detected as said frist group of information, and a second signal when said input sound information is detected as said second group of information;
    a second generating means for generating a confirmation signal; and
    a third means coupled to said first and second generating means for providing said confirmation signal when said first signal is present and for inhibiting said confirmation signal when said second signal is present.

4. A system for sound recognition as claimed in claim 3, in which said correct sound pattern data represents a password pronounced by a person to be registered, and said incorrect sound pattern data represents a word different from said password, said word being pronounced by said person to be registered.

* * * * *

UNITED STATES PATENT AND TRADEMARK OFFICE
CERTIFICATE OF CORRECTION

PATENT NO. : 4,581,755

DATED : April 8, 1986

INVENTOR(S) : Sakoe

It is certified that error appears in the above-identified patent and that said Letters Patent is hereby corrected as shown below:

| COLUMN | LINE | DESCRIPTION |
|---|---|---|
| 2 | 57 | Delete "$\overline{A}HD\ 1$" and insert $--\overline{A}_1--$ |
| 3 | 5 | Delete "$\overline{A}_2 = \overline{\alpha}_1{}^2, \overline{\alpha}_2{}^2, \ldots \overline{\alpha}_J{}^2 \ldots \overline{\alpha}_J{}^1$" and insert the following: $--\overline{A}_2 = \overline{\alpha}_1{}^2, \overline{\alpha}_2{}^2, \ldots \overline{\alpha}_J{}^2 \ldots \overline{\alpha}_J{}^2 --$ |

Signed and Sealed this

Fourteenth Day of June, 1988

*Attest:*

DONALD J. QUIGG

*Attesting Officer*   *Commissioner of Patents and Trademarks*